(12) United States Patent
Harduf et al.

(10) Patent No.: US 12,591,365 B2
(45) Date of Patent: Mar. 31, 2026

(54) INPUT/OUTPUT FENCING OF A SHARED CLOUD STORAGE VOLUME

(71) Applicant: Dell Products L.P., Round Rock, TX (US)

(72) Inventors: Yuval Harduf, Yahud (IL); Valerie Lotosh, Ramat Gan (IL); Dmitry Vladimirovich Krivenok, Dublin (IE); Jehuda Shemer, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 18/419,917

(22) Filed: Jan. 23, 2024

(65) Prior Publication Data

US 2025/0238135 A1     Jul. 24, 2025

(51) Int. Cl.
*G06F 21/60* (2013.01)
*G06F 3/06* (2006.01)

(52) U.S. Cl.
CPC .............. *G06F 3/061* (2013.01); *G06F 3/065* (2013.01); *G06F 3/067* (2013.01)

(58) Field of Classification Search
CPC ........ G06F 3/061; G06F 3/067; G06F 21/602; G06F 2009/45587
USPC ........................................................ 713/150
See application file for complete search history.

(56) References Cited

U.S. PATENT DOCUMENTS

| | | | |
|---|---|---|---|
| 7,769,848 B2 | 8/2010 | Choy et al. | |
| 8,495,323 B1 * | 7/2013 | Tatavarty .............. | G06F 3/0622 |
| | | | 711/6 |
| 10,416,923 B1 | 9/2019 | Kiran et al. | |
| 2005/0091369 A1 | 4/2005 | Jones | |
| 2011/0179231 A1 * | 7/2011 | Roush ................. | G06F 11/1425 |
| | | | 711/147 |
| 2017/0094003 A1 * | 3/2017 | Gahlot .................... | H04L 41/06 |
| 2020/0257448 A1 | 8/2020 | Darwin et al. | |
| 2024/0143790 A1 * | 5/2024 | Don ........................ | G06F 3/067 |
| 2025/0208936 A1 * | 6/2025 | Danino ................. | G06F 11/008 |

* cited by examiner

*Primary Examiner* — Tan Doan
(74) *Attorney, Agent, or Firm* — BainwoodHuang

(57) ABSTRACT

When a first node detects a condition indicating that a second node has possibly failed, the first node changes information associated with the second node without communicating with the second node. The changing of the information associated with the potentially failing second node prevents that node from subsequently accessing a data storage volume that is shared between the nodes. The information that is changed may include an encryption key used to encrypt communications between the second node and the shared storage volume, or an authentication credential that is required for the second node to authenticate to the shared storage volume. In some embodiments, the first and second node may make up at least part of a virtual data storage system, in which each node operates to process host I/O (Input/Output) requests that are received from at least one host.

18 Claims, 6 Drawing Sheets

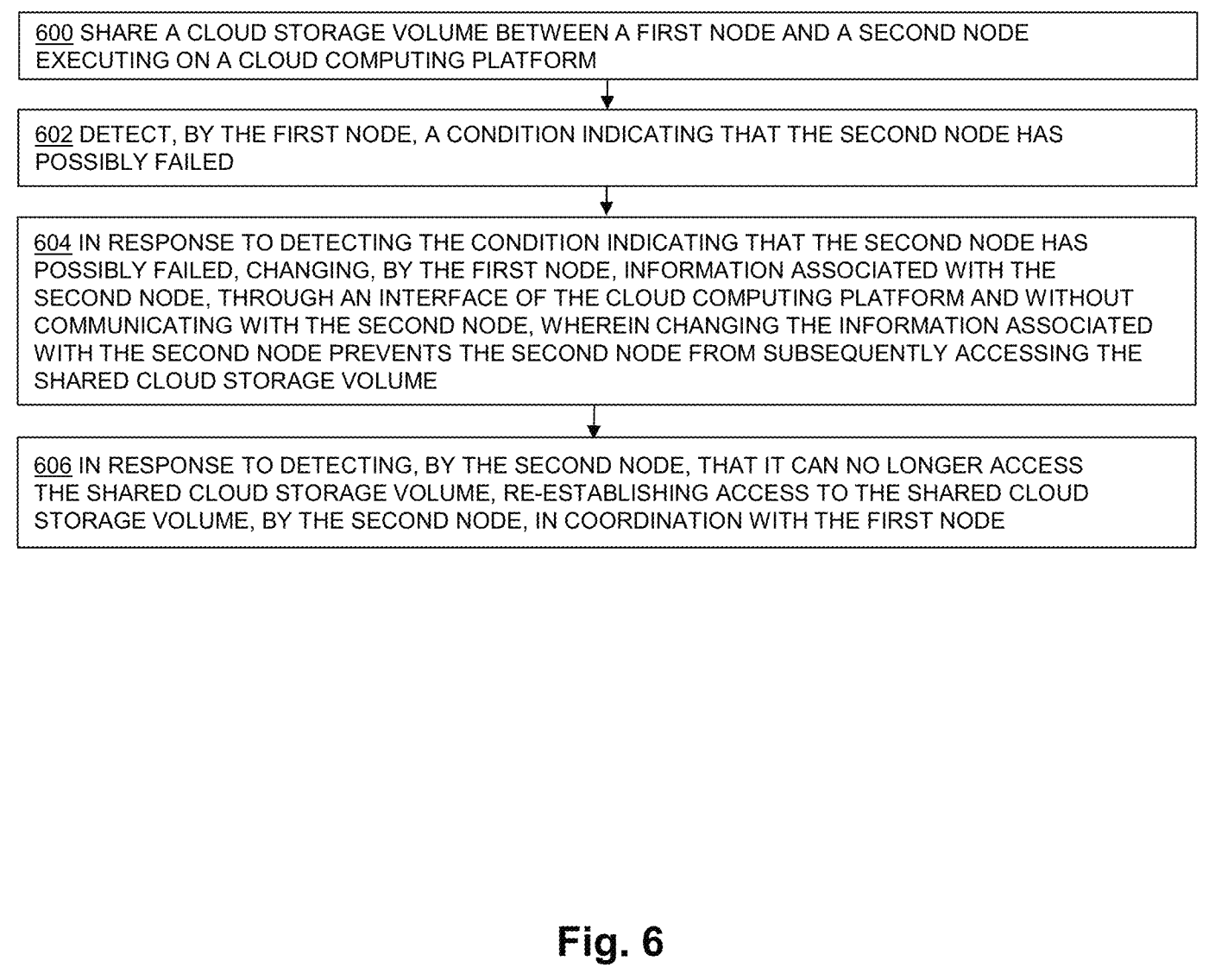

600 SHARE A CLOUD STORAGE VOLUME BETWEEN A FIRST NODE AND A SECOND NODE EXECUTING ON A CLOUD COMPUTING PLATFORM

602 DETECT, BY THE FIRST NODE, A CONDITION INDICATING THAT THE SECOND NODE HAS POSSIBLY FAILED

604 IN RESPONSE TO DETECTING THE CONDITION INDICATING THAT THE SECOND NODE HAS POSSIBLY FAILED, CHANGING, BY THE FIRST NODE, INFORMATION ASSOCIATED WITH THE SECOND NODE, THROUGH AN INTERFACE OF THE CLOUD COMPUTING PLATFORM AND WITHOUT COMMUNICATING WITH THE SECOND NODE, WHEREIN CHANGING THE INFORMATION ASSOCIATED WITH THE SECOND NODE PREVENTS THE SECOND NODE FROM SUBSEQUENTLY ACCESSING THE SHARED CLOUD STORAGE VOLUME

606 IN RESPONSE TO DETECTING, BY THE SECOND NODE, THAT IT CAN NO LONGER ACCESS THE SHARED CLOUD STORAGE VOLUME, RE-ESTABLISHING ACCESS TO THE SHARED CLOUD STORAGE VOLUME, BY THE SECOND NODE, IN COORDINATION WITH THE FIRST NODE

Fig. 6

INPUT/OUTPUT FENCING OF A SHARED CLOUD STORAGE VOLUME

TECHNICAL FIELD

The present disclosure relates generally to technology that provides Input/Output (I/O) fencing for a shared cloud storage volume.

BACKGROUND

Input/Output (I/O) fencing is a method of preventing data corruption in a shared-data storage computing environment that involves isolating a potentially malfunctioning node from accessing the shared data storage. If a node with access to shared data storage appears to be malfunctioning, a non-failed node or nodes should "fence" out the potentially problematic node from the shared data storage, in order to ensure that it does not use the shared data storage in a way that corrupts the data stored thereon.

In some contexts, purpose-built hardware can be used to enforce I/O fencing. Hardware I/O fencing mechanisms include hardware through which a non-failed node can directly control the internal hardware resources of a failed or failing node, and thereby force it to disconnect from shared data storage, or even force it to reboot if necessary.

However, in software-defined execution environments, including those in which the nodes that share the data storage resources are virtual machines operating in a cloud computing platform, hardware-based I/O fencing mechanisms that provide a non-failed node with direct access to the internal hardware resources of a problematic node are not available.

SUMMARY

In the disclosed technology, at least one cloud storage volume is shared between a first node and a second node executing on a cloud computing platform. In response to detecting, by the first node, a condition indicating that the second node has possibly failed, information associated with the second node is changed through an interface of the cloud computing platform, without communicating with the second node. The changing of the information associated with the second node prevents the second node from subsequently accessing the shared cloud storage volume.

In some embodiments, the first node and the second node are at least part of a virtual storage system, and the first node and the second node each process host I/O (Input/Output) requests received from at least one host.

In some embodiments, the information associated with the second node is an encryption key associated with the second node that is currently being used to encrypt communications between the second node and the shared cloud storage volume.

In some embodiments, a first copy of the encryption key associated with the second node is stored within the second node for use by the second node, and a second copy of the encryption key associated with the second node is stored externally with regard to the second node, for use on behalf of the shared cloud storage volume. Changing the information associated with the second node in such embodiments is performed by changing the second copy of the encryption key associated with the second node.

In some embodiments, the storing of the second copy of the encryption key associated with the second node external to the second node and for use on behalf of the shared cloud storage volume is performed by storing the second copy of the encryption key within a cloud storage service that provides the shared cloud storage volume. In such embodiments, changing the second copy of the encryption key associated with the second node is performed by changing the second copy of the encryption key stored within the cloud storage service.

In some embodiments, the storing of the second copy of the encryption key associated with the second node external to the second node and for use on behalf of the shared cloud storage volume is performed by storing the second copy of the encryption key into a storage controller that controls all communications with the shared cloud storage volume. In such embodiments, the changing of the second copy of the encryption key associated with the second node is performed by changing the second copy of the encryption key within the storage controller that controls all communications with the shared cloud storage volume.

In some embodiments, the changing of the information associated with the second node is performed by changing the encryption key associated with the second node to a different encryption key.

In some embodiments, the changing of the information associated with the second node is performed by invalidating the encryption key associated with the second node.

In some embodiments, the information associated with the second node is at least one authentication credential associated with the second node that is required for the second node to communicate with the shared cloud storage volume.

In some embodiments, a first copy of the authentication credential associated with the second node is stored within the second node for use by the second node, and a second copy of the authentication credential associated with the second node is stored externally with regard to the second node and for use on behalf of the shared cloud storage volume. In such embodiments, changing the information associated with the second node is performed by changing the second copy of the authentication credential associated with the second node.

In some embodiments, storing the second copy of the authentication credential associated with the second node external to the second node and for use on behalf of the shared cloud storage volume is performed by storing the second copy of the authentication credential within a cloud storage service that provides the shared cloud storage volume. In such embodiments, changing the second copy of the authentication credential associated with the second node is performed by changing the second copy of the authentication credential within the cloud storage service.

In some embodiments, the storing of the second copy of the authentication credential associated with the second node external to the second node and for use on behalf of the shared cloud storage volume is performed by storing the second copy of the authentication credential into a storage controller that controls all communications with the shared cloud storage volume. In such embodiments, the changing of the second copy of the authentication credential associated with the second node is performed by changing the second copy of the authentication credential within the storage controller that controls all communications with the shared cloud storage volume.

In some embodiments, the changing of the information associated with the second node is performed by changing the authentication credential associated with the second node to a different authentication credential.

In some embodiments, the changing of the information associated with the second node is performed by invalidating the authentication credential associated with the second node.

In some embodiments, the authentication credential associated with the second node is a password of the second node.

In some embodiments, the authentication credential associated with the second node is a digital certificate issued to the second node.

In some embodiments, the disclosed technology further includes detecting, by the first node, the condition indicating that the second node has possibly failed at least in part by detecting that the second node has not communicated with the first node within a predetermined time limit.

In some embodiments, the disclosed technology further includes, in response to detecting, by the second node, that it can no longer access the shared cloud storage volume, re-establishing access to the shared cloud storage volume by the second node in coordination with the first node.

The disclosed technology is integral to a technical solution to the problem of providing effective I/O fencing with regard to a shared storage volume in a virtualized execution environment. In virtual execution environments, such as cloud execution environments, specialized hardware is not available to the non-failed nodes when a node is suspected to have failed. The disclosed technology advantageously enables a non-failing node to perform I/O fencing of a node that may have failed by performing actions that completely circumvent the failed or failing node, but are still effective in preventing that node from accessing a shared cloud storage volume.

For example, the disclosed technology may be effective in cases where a heavy received load results in the processor resources allocated from the execution platform to an individual node to be insufficient, causing the node to pause and effectively become "frozen" for what may be a lengthy time period. In cases where nodes sharing a storage volume use the shared storage volume to perform a time sensitive service (e.g. persistent storage of received host data), it is critical that the frozen node be quickly fenced off from the shared storage volume, so that the non-failing node(s) can continue to provide the service using the shared storage volume. Moreover, the frozen node may have been frozen while in the process of modifying the shared storage volume. It is therefore important that the frozen node be automatically and quickly fenced off from the shared storage volume, before it subsequently becomes unfrozen as a result of receiving sufficient processor resources to execute, since later completion of modifications to the shared storage volume that were underway within the frozen node at the time it was frozen could result in data corruption. The disclosed technology enables I/O fencing to be performed automatically and immediately upon detecting that a node has possibly become frozen, by the modification of information associated with the frozen node, such as an encryption key or authentication credential, without communicating with the second node. When the frozen node subsequently becomes unfrozen, it detects that it cannot access the shared storage volume, and in this way is forced to safely re-establish access to the shared storage volume in coordination with the non-failed node or nodes.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

FIG. 6 is a flow chart showing an example of steps performed in some embodiments.

DETAILED DESCRIPTION

Figure 1:
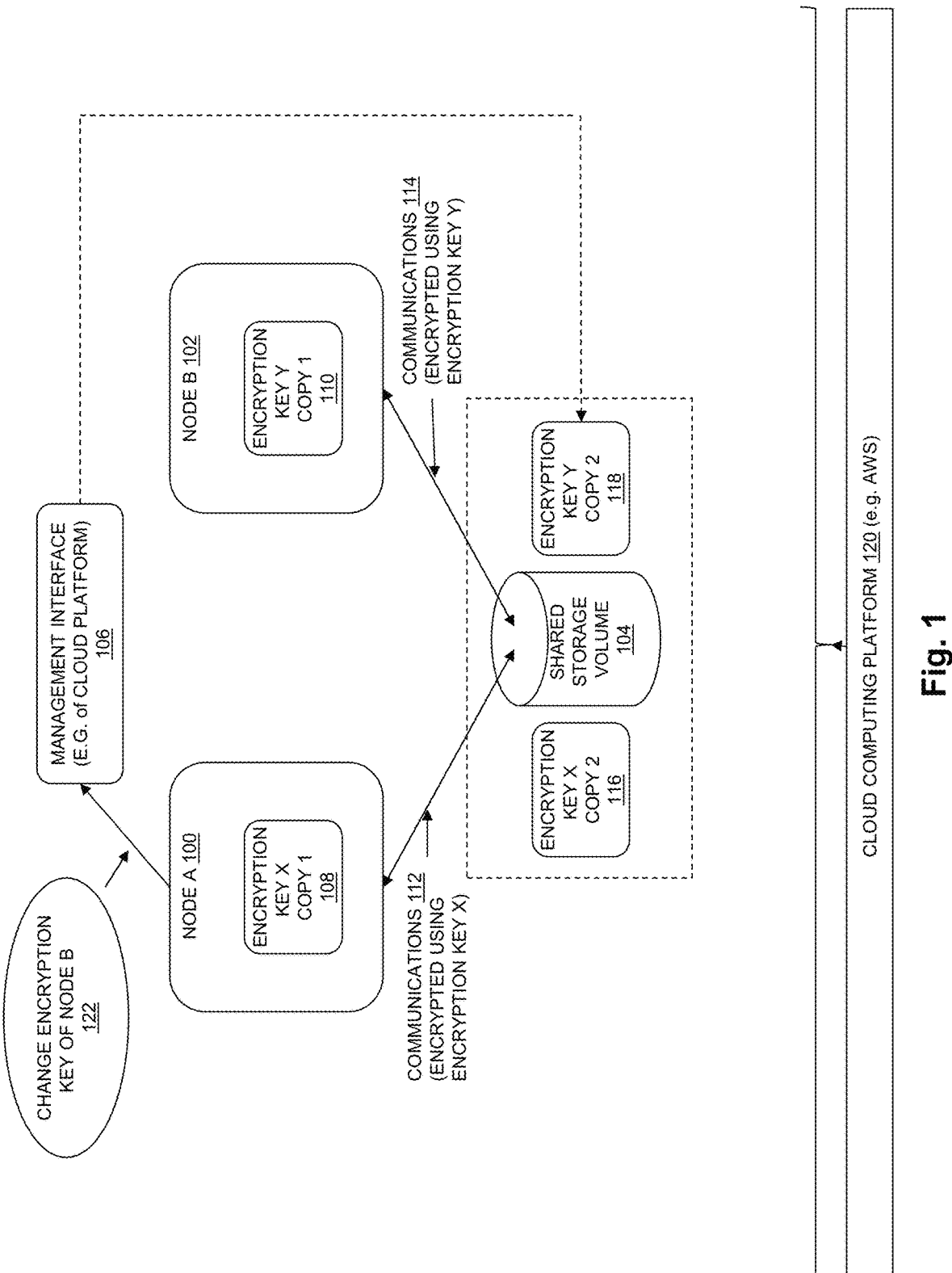
FIG. 1 is a block diagram showing an example of components in an illustrative embodiment of the disclosed technology performing I/O fencing of a shared cloud storage volume.

Embodiments will now be described with reference to the figures. The embodiments described herein are provided only as examples, in order to illustrate various features and principles of the disclosed technology, and are not limiting. The embodiments of the disclosed technology described herein are integrated into a practical solution for providing prompt, automatic I/O fencing with regard to a shared storage volume in a virtualized execution environment.

As described further herein, at least one cloud storage volume is shared between a first node and a second node executing on a cloud computing platform. The first and second node may be embodied as at least part of a virtual storage system, and process host I/O (Input/Output) requests received from at least one host. Those skilled in the art will recognize that the disclosed technology is not limited to virtual storage systems, and may be applied successfully to various other applications.

In response to detecting, by the first node, a condition indicating that the second node has possibly failed, information associated with the second node is changed, e.g. through an interface of the cloud computing platform. The information associated with the second node is changed at the initiation of the first node, and without communicating with the second node. The changing of the information associated with the second node prevents the second node from subsequently accessing the shared cloud storage volume without coordinating such access with the first node.

The information associated with the second node may be an encryption key associated with the second node that is currently being used to encrypt and/or decrypt communications between the second node and the shared cloud storage volume. A first copy of the encryption key associated with the second node may be stored within the second node for use by the second node. A second copy of the encryption key associated with the second node is stored externally with regard to the second node, for use on behalf of the shared cloud storage volume with regard to communications performed between the shared cloud storage volume and the second node. Changing the information associated with the second node in such embodiments may be performed by changing the second copy of the encryption key associated with the second node.

The storing of the second copy of the encryption key associated with the second node externally with regard to the second node, for use on behalf of the shared cloud storage volume, may be performed by storing the second copy of the encryption key within a cloud storage service that provides the shared cloud storage volume. The changing of the second copy of the encryption key associated with the second node may then be performed by changing the second copy of the encryption key stored within the cloud storage service.

Alternatively, the storing of the second copy of the encryption key associated with the second node external to the second node and for use on behalf of the shared cloud storage volume may be performed by storing the second copy of the encryption key into a storage controller that controls all communications with the shared cloud storage volume. The changing of the second copy of the encryption key associated with the second node may then be performed by changing the second copy of the encryption key within the storage controller that controls all communications with the shared cloud storage volume.

Changing the information associated with the second node may be performed by changing the second copy of the encryption key associated with the second node to a different encryption key. Alternatively, changing the information associated with the second node may be performed by invalidating the second copy of the encryption key associated with the second node.

In an alternative embodiment, the information associated with the second node may be at least one authentication credential associated with the second node. The authentication credential is required to be presented by the second node in order for the second node to establish communications with the shared cloud storage volume. A first copy of the authentication credential associated with the second node may be stored within the second node for use by the second node, and a second copy of the authentication credential associated with the second node may be stored external to the second node and for use on behalf of the shared cloud storage volume to authenticate the second node. The changing of the information associated with the second node may be performed by changing the second copy of the authentication credential associated with the second node.

Alternatively, the second copy of the authentication credential associated with the second node may be stored external to the second node and for use on behalf of the shared cloud storage volume by storing the second copy of the authentication credential within a cloud storage service that provides the shared cloud storage volume. Changing the second copy of the authentication credential associated with the second node may then be performed by changing the second copy of the authentication credential within the cloud storage service.

Alternatively, the second copy of the authentication credential associated with the second node may be stored external to the second node and for use on behalf of the shared cloud storage volume by storing the second copy of the authentication credential into a storage controller that controls all communications with the shared cloud storage volume. The changing of the second copy of the authentication credential associated with the second node may then be performed by changing the second copy of the authentication credential within the storage controller that controls all communications with the shared cloud storage volume.

Changing the information associated with the second node may be performed by changing the second copy of the authentication credential associated with the second node to a different authentication credential. Alternatively, changing of the information associated with the second node may be performed by invalidating the second copy of the authentication credential associated with the second node.

Examples of authentication credentials associated with the second node that may be changed include a password of the second node, and/or a digital certificate issued to the second node.

The first node may detect the condition indicating that the second node has possibly failed at least in part by detecting that the second node has not communicated with the first node within a predetermined time limit, e.g. by updating a mailbox, counter, or other predetermined data object located within the shared cloud storage volume within the predetermined time limit. When the second node detects that it can no longer access the shared cloud storage volume, it reestablishes access to the shared cloud storage volume safely in coordination with the first node.

FIG. 1 is a block diagram showing an example of components in an illustrative embodiment of the disclosed technology performing I/O fencing of a shared cloud storage volume, e.g. of the Shared Storage Volume 104. Cloud Computing Platform 120 may, for example, be a public cloud computing platform. Cloud Computing Platform 120 may include a hypervisor or the like, executing on one or more server computer systems. In the example of FIG. 1, Node A 100 and Node B 102 are virtual machines that each execute on Cloud Computing Platform 120 as an instance of a virtual machine type provided by the Cloud Computing Platform 120. Cloud Computing Platform 120 may, for example, consist of or include Amazon Web Services (AWS) operated by Amazon.com, Inc., Azure operated by Microsoft Corporation, and/or some other specific cloud computing platform. For example, in embodiments in which the Cloud Computing Platform 120 is AWS, Node A 100 and Node B 102 may be embodied using Amazon Elastic Compute Cloud (EC2), and may each be an EC2 Nitro instance. The disclosed technology may alternatively be embodied using any specific virtualization environment, including but not limited to VMware (e.g. using the VMware ESXi hypervisor), Microsoft HyperV, OpenStack, KVM (Kernel-based Virtual Machine), or Kubernetes, each of which includes an appropriate management interface (API, CLI, etc.) for the disclosed I/O fencing techniques.

Node A 100 and Node B 102 are program code (software) that executes on processing resources of Cloud Computing Platform 120 that are provisioned and/or otherwise allocated from Cloud Computing Platform 120 for execution of Node A 100 Node B 102. Such resources may include processing circuitry of one or more processors (e.g., one or more central processing units (CPUs)), memory, data storage I/O and/or network communication interface resources of one or more server computer systems in Cloud Computing Platform 120. Node A 100 and Node B 102, together with the cloud compute and other resources of Cloud Computing Platform 120 that are provisioned and/or otherwise allocated from Cloud Computing Platform 138 for execution of Node A 100 and Node B 102, form control circuitry that is configured and arranged to carry out various methods and functions described herein. Node A 100 and Node B 102 include a variety of software components that may be provided in the form of executable program code. When instructions in this program code are executed by the cloud compute resources of Cloud Computing Platform 120 provisioned and/or otherwise allocated for the execution of Node A 100 and Node B 102, including at least one central processing unit, those cloud compute resources are caused to carry out the operations of the software components described herein. Although certain software components are shown in the Figures and described herein for purposes of illustration and explanation, those skilled in the art will recognize that Node A 100 and/or Node B 102 may also include various other specific types of software components that are not shown.

During operation of the components shown in FIG. 1, the persistent data storage within Shared Storage Volume 104 is shared between Node A 100 and Node B 102. Both Node A 100 and Node B 102 may accordingly store data to and retrieve data from Shared Storage Volume 104. Shared Storage Volume 104 may be one of multiple cloud storage volumes that are shared by Node A 100 and 102. Shared Storage Volume 104 may be embodied as a cloud storage volume that is capable of being attached to multiple virtual machines. Accordingly, Shared Storage Volume 104 may be created (e.g. using a cloud storage service of Cloud Computing Platform 120) as an instance of a cloud storage volume type that provides multi-attach capabilities. For example, in embodiments in which the Cloud Computing Platform 120 is AWS, Shared Storage Volume 104 may be created as an io1 or io2 SSD (Solid State Drive) storage volume using Amazon Elastic Block Store (Amazon EBS).

Node A 100 includes logic for detecting when Node B 102 has potentially failed. For example, when operating correctly, Node B 102 may periodically perform a "keep-alive" communication with Node A 100 that indicates to Node A 100 that Node B 102 is operating correctly. Node A 100 may detect a condition indicating that Node B 102 has possibly failed in the case where the period since the last time that Node B 102 performed such a communication exceeds a predetermined time limit. The communication from Node B 102 to Node A 100 indicating that Node B 102 is operating correctly may be implemented in various ways. In some embodiments, the communication from Node B 102 to Node A 100 indicating that Node B 102 is operating correctly is performed by way of a direct communication between Node B 102 and Node A 100. In other embodiments, Node B 102 periodically writes to a predetermined data object (sometimes referred to as a "mailbox") that is stored in Shared Storage Volume 104. For example, Node B 102 may periodically write a timestamp to Shared Storage Volume 104 indicating the current time at which the write was performed. In the case where Node A 100 reads the data object and determines that the timestamp in the data object is older than the predetermined time limit, Node 100 detects a condition indicating that Node B 102 has possibly failed. In another example, Node B 102 may periodically increment a counter stored in the Shared Storage Volume 104. Node A 100 detects a condition indicating that Node B 102 has possibly failed in the case where Node A 100 reads the counter and determines that it has not been incremented for a time duration greater than the predetermined time limit.

Node B 102 may also include similar logic for detecting when Node A 100 has potentially failed.

In response to detecting the condition indicating that Node B 102 has possibly failed, Node A 100 changes information associated with Node B 102. For example, the information associated with Node B 102 may be changed by Node A 100 issuing a command 122 to an interface (e.g. an Application Programming Interface or "API") of Cloud Computing Platform 120, shown for purposes of illustration in FIG. 1 by Management Interface 106.

In the example of FIG. 1, the information associated with Node B 102 that is changed by Node A 100 is an encryption key of Node B 102. For example, the command 122 issued by Node A 100 causes Cloud Computing Platform 120 to change an encryption key "Y", which was previously negotiated by Node B 102 while establishing Communications 114 between Node B 102 and Shared Storage Volume 104, and that is currently being used to encrypt and/or decrypt Communications 114 between Node B 102 and Shared Storage Volume 104 at the time that Node A 100 detects the condition indicating that Node B 102 has possibly failed. Alternatively, Management Interface 106 may be an interface to a Key Management System (KMS) that is internal or external to Cloud Computing Platform 120, and the changing of encryption key "Y" is performed by the KMS. Command 122 causes the encryption key "Y" to be changed by the Cloud Computing Platform 120 or the KMS without communication with Node B 102. Changing the encryption key "Y" prevents Node B 102 from subsequently accessing Shared Storage Volume 104 without reestablishing such access in coordination with Node A 100. In the example of FIG. 1, Communications 112 between Node A 100 and Shared Storage Volume 104 are encrypted and/or decrypted using a different encryption key, e.g. an encryption key "X". Accordingly, the changing of encryption key "Y" does not affect Communications 112.

In some embodiments, in order for Node A 100 to change the encryption key "Y" of Node B 102, special permissions may need to be granted to Node A 100. Alternatively, a separate management node, other than Node A 100 or Node B 102, may be granted the necessary special permissions to allow the changing of encryption key "Y" of Node B 102, and is then used by Node A 100 to issue the command 122. In the case where a cloud computing platform does not directly expose an API or the like that enables changing of the encryption key "Y" of Node B 102 by Node A 100 or a separate management node, the disclosed technology may be embodied such that a special service of the cloud computing platform may be used to expose this functionality.

As shown in FIG. 1 by Encryption Key Y Copy 1 110, at the time that Node A 100 detects the condition indicating that Node B 102 has possibly failed, a first copy of the encryption key "Y" associated with Node B 102 is currently stored within Node B 102, for use by Node B 102 to encrypt and/or decrypt the Communications 114. For example, Encryption Key Y Copy 1 110 may be used by Node B 102 to encrypt data prior to sending the data to Shared Storage Volume 104, and/or to decrypt data received from Shared Storage Volume 104.

As shown by Encryption Key Y Copy 2 118, also at the time that Node A 100 detects the condition indicating that Node B 102 has possibly failed, a second copy of the encryption key "Y" associated with Node B 102 is currently stored externally with regard to the Node B 102, i.e. outside of Node B 102 and not directly accessible by Node A 100 or Node B 102, for use on behalf of Shared Storage Volume 104. For example, Encryption Key Y Copy 2 118 may be stored in components of Cloud Computing Platform 120 associated with Shared Storage Volume 104, and used by those components to encrypt data read from Shared Storage Volume 104 prior to sending the data to Node B 102, and/or to decrypt data received from Node B 102. Processing of the command 122 by Cloud Computing Platform 120 may cause Cloud Computing Platform 120 to change the encryption key "Y" by changing only Encryption Key Y Copy 2 118.

Alternatively, Encryption Key Y Copy 2 118 may be stored in components of a KMS associated with Shared Storage Volume 104, and used by those components to encrypt data read from Shared Storage Volume 104 prior to sending the data to Node B 102, and/or to decrypt data received from Node B 102. Processing of the command 122 by Cloud Computing Platform 120 may cause the KMS to change the encryption key "Y" by changing only Encryption Key Y Copy 2 118.

Processing of the command 122 by Cloud Computing Platform 120 (or by a KMS) may change Encryption Key Y Copy 2 118 to a different encryption key, e.g. to a value indicated by Node A 100 in the command 122. Alternatively, processing of the command 122 by Cloud Computing Platform 120 (or by a KMS) may change Encryption Key Y Copy 2 118 by invalidating Encryption Key Y Copy 2 118.

As also shown in FIG. 1, similarly as described above with regard to encryption key "Y" above, Encryption Key X Copy 1 108 is a first copy of the encryption key "X" that is stored within Node A 100 for use by Node A 100 with regard to the encryption and/or decryption of Communications 112 between Node A 100 and Shared Storage Volume 104, and Encryption Key X Copy 2 116 is a second copy of the encryption key "X" stored external to Node A 100 for use on behalf of Shared Storage Volume 104 with regard to the encryption and/or decryption of Communications 112 between Node A 100 and Shared Storage Volume 104.

Figure 2:
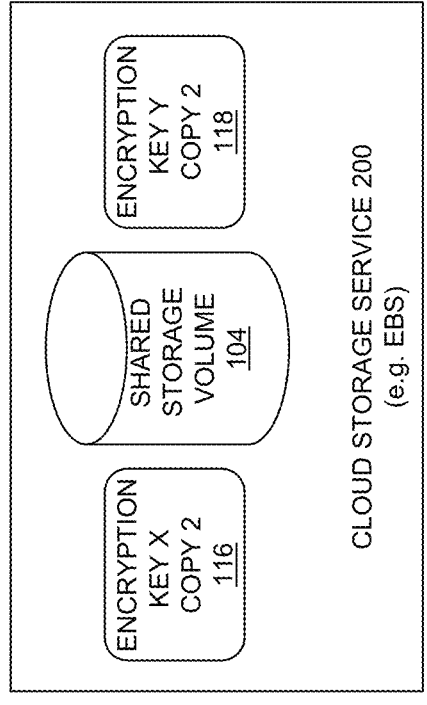
FIG. 2 is a block diagram showing an example of components in an illustrative embodiment of the disclosed technology in which a second copy of an encryption key is stored into a cloud storage service that provides the shared cloud storage volume.

FIG. 2 shows an example of components in an illustrative embodiment of the disclosed technology in which the second copy of each encryption key shown in FIG. 1 is stored within the resources of a Cloud Storage Service 200 within Cloud Computing Platform 120, where Cloud Storage Service 200 provides Shared Storage Volume 104 for use by Node A 100 and Node B 102. For example, where Cloud Computing Platform 120 is AWS, Cloud Storage Service 200 may be Amazon Elastic Block Store (Amazon EBS), and Shared Storage Volume 104 may be either an io1 or an io2 cloud storage volume. In such embodiments, the changing of Encryption Key Y Copy 2 118 by Cloud Computing Platform 120 in response to command 122 may be performed by changing Encryption Key Y Copy 2 118 within Cloud Storage Service 200.

Figure 3:
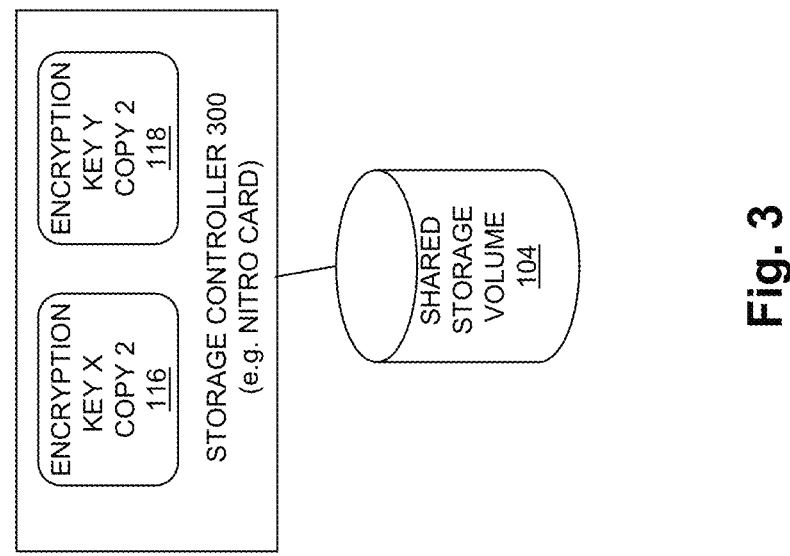
FIG. 3 is a block diagram showing an example of components in an illustrative embodiment of the disclosed technology in which the second copy of the encryption key is stored into a storage controller that controls all communications with the shared cloud storage volume.

FIG. 3 shows an example of components in an illustrative embodiment of the disclosed technology in which the second copy of each encryption key shown in FIG. 1 is stored within a Storage Controller 300 that controls all communications with Shared Storage Volume 104. For example, in the case where Cloud Computing Platform 120 is AWS, Node A 100 and Node B 102 may each be embodied using Amazon Elastic Compute Cloud (EC2), e.g. as EC2 Nitro instances. In such embodiments, Storage Controller 300 may be a Nitro Card for Local NVMe (Non-Volatile Memory express) Storage, or a Nitro Card for EBS. Further in such embodiments, the changing of the Encryption Key Y Copy 2 118 by Cloud Computing Platform 120 in response to command 122 may be performed by changing Encryption Key Y Copy 2 118 within Storage Controller 300.

Figure 4:
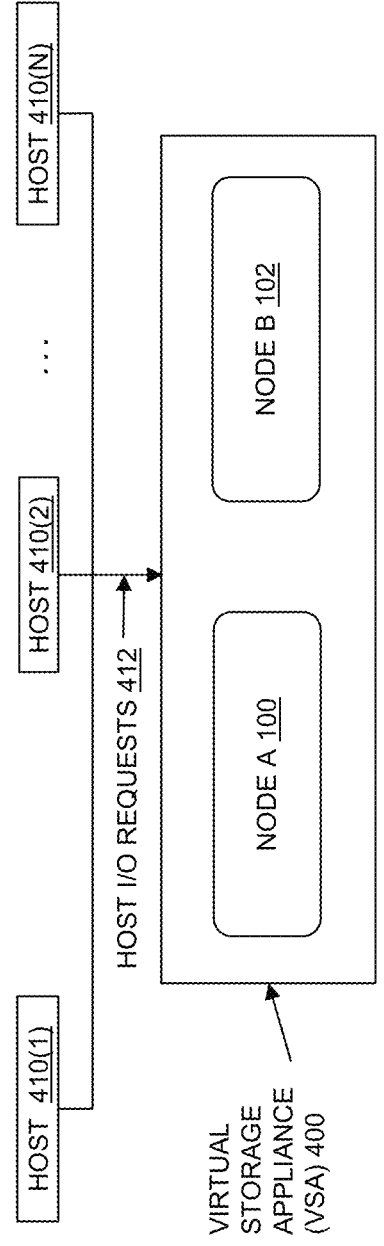
FIG. 4 is a block diagram showing an example of components in an illustrative embodiment of the disclosed technology in which the first and second nodes that share the cloud storage volume are part of a virtual storage appliance.

FIG. 4 shows an example of components in an illustrative embodiment of the disclosed technology in which Node A 100 and Node B 102 are part of a Virtual Storage Appliance (VSA) 400 that provides data storage service to one or more hosts. VSA 400 is a software appliance that processes Host I/O Requests 412 it receives from virtual or physical host machines (referred to as "hosts"), which are shown by Host 410(1) through Host 410(N). The Host I/O Requests 412 received and processed by VSA 400 specify user data that is written and/or read by the hosts. Both Node A 100 and Node B 102 in VSA 400 include software logic that processes the Host I/O Requests 412 by performing various data processing tasks to efficiently organize and persistently store the specified user data in user accessible storage objects that are built by the VSA 400 using portions of the non-volatile data storage in Shared Storage Volume 104. The user accessible storage objects may, for example, include file-level storage objects (e.g. files), and/or block-level storage objects (e.g. virtual disks), and Host I/O Requests 412 may include file-based and/or block-based I/O requests that access those storage objects.

Those skilled in the art will recognize that the technology disclosed herein is not limited to embodiments in which Node A 100 and Node B 102 provide a data storage service to hosts. The disclosed technology may alternatively be effectively applied to other applications that use shared volumes, such as distributed databases, and/or to systems that use quorum-based (majority) votes for consistency reasons or leader identification.

Figure 5:
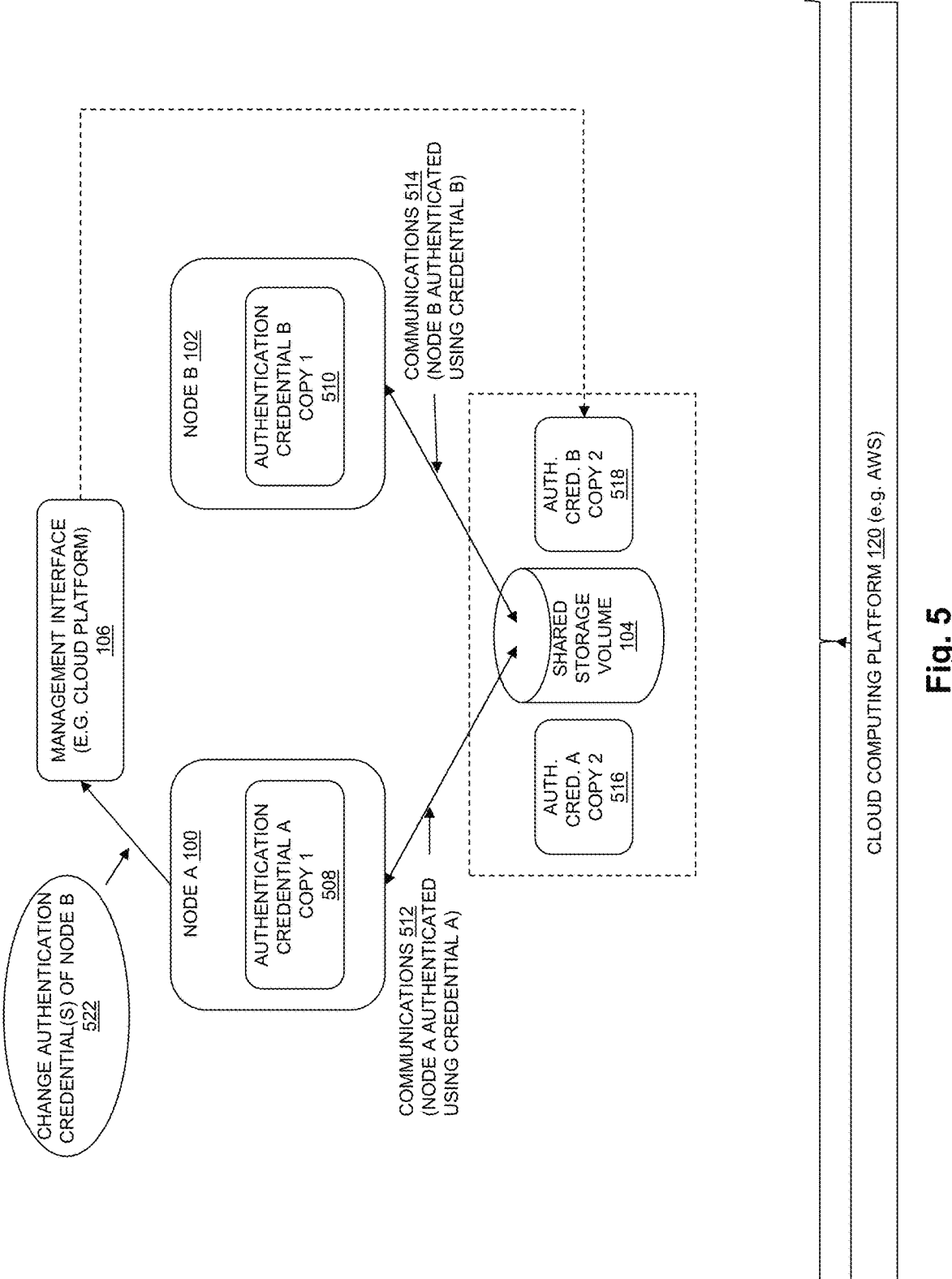
FIG. 5 is a block diagram showing an example of components in an illustrative embodiment of the disclosed technology in which the information associated with the second node that is changed in order to accomplish the I/O fencing is at least one authentication credential associated with the second node.

FIG. 5 shows an example of components in an illustrative embodiment of the disclosed technology in which the information associated with Node B 102 that is changed by Node A 100 in response to detecting the condition indicating that Node B 102 has possibly failed is an authentication credential of Node B 102, e.g. an authentication credential "B" associated with Node B 102. The authentication credential "B" is required to be presented by Node B 102 in order for the identity and/or authority of Node B 102 to be authenticated when establishing communications with Shared Storage Volume 104, e.g. through a Challenge-Handshake Authentication Protocol (CHAP), or through some other type of authentication protocol. Examples of the authentication credential "B" associated with Node B 102 that may be changed include a password of Node B 102, a digital certificate issued to Node B 102, and/or any other specific type of authentication credential. For example, a command 522 issued by Node A 100 in response to detecting the condition indicating that Node B 102 has possibly failed may cause Cloud Computing Platform 120 to change the authentication credential "B", and also cause Cloud Computing Platform 120 (e.g. a cloud storage service that provides Shared Storage Volume 104, or a storage controller that controls all communications with Shared Storage Volume 104) to require that Node B 102 re-authenticate itself in order to continue accessing Shared Storage Volume 104. In this way, changing the authentication credential "B" prevents Node B 102 from subsequently accessing Shared Storage Volume 104 without reestablishing such access safely in coordination with Node A 100.

Further in the example of FIG. 5, Node A 100 is authenticated using an authentication credential "A" associated with Node A 100 when Communications 512 are established between Node A 100 and Shared Storage Volume 104, and accordingly the changing of the authentication credential "B" does not affect Communications 512.

As also shown in FIG. 5 by Authentication Credential B Copy 1 510, at the time that Node A 100 detects the condition indicating that Node B 102 has possibly failed, a first copy of the authentication credential "B" associated with Node B 102 is currently stored within Node B 102, and is presented by Node B 102 when Node B 102 authenticates itself to establish Communications 514 and access Shared Storage Volume 104. Authentication Credential B Copy 2 518 is a second copy of the authentication credential "B" associated with Node B 102, and is currently stored externally with regard to the Node B 102, i.e. outside of Node B 102, and is not directly accessible by Node A 100 or Node B 102. Authentication Credential B Copy 2 518 is used on behalf of Shared Storage Volume 104 to authenticate Node B 102. For example, Encryption Key Y Copy 2 118 may be stored in components of Cloud Computing Platform 120 associated with Shared Storage Volume 104, and used by those components to authenticate Node B 102, e.g. by comparing Authentication Credential B Copy 2 518 to the authentication credential that is presented by Node B 102, and only authenticating Node B 102 in the event of a match. Processing of the command 522 by Cloud Computing Platform 120 may cause Cloud Computing Platform 120 to change the authentication credential "B" by changing only Authentication Credential B Copy 2 518, and then requiring Node B 102 to re-authenticate. When Node B 102 attempts to re-authenticate, Authentication Credential B Copy 2 is compared to the credential presented by Node B 102, i.e. Authentication Credential B 1 510, a mismatch is detected, and Node B 102 is prevented from accessing Shared Storage Volume 104 until it safely reestablishes access to Shared Storage Volume 104 in coordination with Node A 100.

Processing of the command 522 by Cloud Computing Platform 120 may change Authentication Credential B Copy 2 518 to a different credential, e.g. to a value indicated by Node A 100 in the command 522. Alternatively, processing of the command 522 by Cloud Computing Platform 120 may change Authentication Credential B Copy 2 518 by invalidating Authentication Credential B Copy 2 518.

As also shown in the example of FIG. 5, Authentication Credential A Copy 1 508 is a first copy of the authentication credential "A" that is stored within Node A 100 for presentation by Node A 100 to authenticate itself when establishing Communications 512 between Node A 100 and Shared Storage Volume 104, and Authentication Credential A Copy 2 516 is a second copy of the authentication credential "A" stored external to Node A 100 for use on behalf of Shared Storage Volume 104 with regard to authenticating Node A 100. Communications 512 are unaffected by the changing of Authentication Credential B Copy 2 518.

The second copy of each authentication credential shown in FIG. 5 may be stored within resources of Cloud Storage Service 200 of Cloud Computing Platform 120. In such embodiments, the changing of Authentication Credential B Copy 2 518 by Cloud Computing Platform 120 in response to command 522 may be performed by changing Authentication Credential B Copy 2 518 within Cloud Storage Service 200.

Alternatively, the second copy of each encryption key shown in FIG. 5 may be stored within a storage controller that controls all communications with Shared Storage Volume 104. In such embodiments, the changing of the Authentication Credential B Copy 2 518 by Cloud Computing Platform 120 in response to command 522 may be performed by changing Authentication Credential B Copy 2 518 within that storage controller.

FIG. 6 is a flow chart showing an example of steps performed in some embodiments of the disclosed technology.

At step 600, a cloud storage volume is shared between a first node and a second node executing on a cloud computing platform.

At step 602, the first node detects a condition indicating that the second node has possibly failed.

At step 604, in response to detecting the condition indicating that the second node has possibly failed, the first node changes information associated with the second node, through an interface of the cloud computing platform and without communicating with the second node. Changing the information associated with the second node prevents the second node from subsequently accessing the shared cloud storage volume.

At step 606, in response to detecting that it can no longer access the shared cloud storage volume, the second node safely re-establishes access to the shared cloud storage volume in coordination with the first node. For example, the second node may re-establish access to the shared cloud storage volume in part by first establishing a communication connection with the first node, and then exchanging relevant information with the first node. The second node then re-establishes communications between the second node and the shared cloud storage volume using a different encryption key than was previously used to secure communications between the second node and the cloud storage volume, e.g. a newly created encryption key. In another example, the second node may re-establish access to the cloud storage volume by re-establishing communications between the second node and the shared cloud storage volume in part by using a newly created authentication credential that is different from the one that was previously used to authenticate the second node. In the case where the second node had become frozen, safely re-establishing access to the shared storage volume further includes preventing completion of any modifications to the shared storage volume that were underway within the second node at the time it was frozen, and that could otherwise result in data corruption within the shared storage volume.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
sharing at least one cloud storage volume between a first node and a second node executing on a cloud computing platform;
in response to detecting, by the first node, a condition indicating that the second node has possibly failed, changing information associated with the second node, through an interface of the cloud computing platform and without communicating with the second node, wherein the information associated with the second node comprises an encryption key associated with the second node that is currently being used to encrypt communications between the second node and the shared cloud storage volume, and wherein changing the information associated with the second node prevents the second node from subsequently accessing the shared cloud storage volume;
storing, within the second node for use by the second node, a first copy of the encryption key associated with the second node;
storing, external to the second node and for use on behalf of the shared cloud storage volume, a second copy of the encryption key associated with the second node; and wherein changing the information associated with the second node comprises changing the second copy of the encryption key associated with the second node.

2. The method of claim 1, wherein the first node and the second node comprise a virtual storage system, and wherein the first node and the second node each process host I/O (Input/Output) requests received from at least one host.

3. The method of claim 1, wherein storing the second copy of the encryption key associated with the second node external to the second node and for use on behalf of the shared cloud storage volume comprises storing the second copy of the encryption key within a cloud storage service that provides the shared cloud storage volume; and
wherein changing the second copy of the encryption key associated with the second node comprises changing the second copy of the encryption key stored within the cloud storage service.

4. The method of claim 1, wherein storing the second copy of the encryption key associated with the second node external to the second node and for use on behalf of the shared cloud storage volume comprises storing the second copy of the encryption key into a storage controller that controls all communications with the shared cloud storage volume; and
wherein changing the second copy of the encryption key associated with the second node comprises changing the second copy of the encryption key within the storage controller that controls all communications with the shared cloud storage volume.

5. The method of claim 1, wherein changing the information associated with the second node comprises changing the encryption key associated with the second node to a different encryption key.

6. The method of claim 1, wherein changing the information associated with the second node comprises invalidating the encryption key associated with the second node.

7. The method of claim 1, wherein the information associated with the second node comprises at least one authentication credential associated with the second node that is required for the second node to communicate with the shared cloud storage volume.

8. The method of claim 7, further comprising:
storing, within the second node for use by the second node, a first copy of the authentication credential associated with the second node;
storing, external to the second node and for use on behalf of the shared cloud storage volume, a second copy of the authentication credential associated with the second node; and
wherein changing the information associated with the second node comprises changing the second copy of the authentication credential associated with the second node.

9. The method of claim 8, wherein storing the second copy of the authentication credential associated with the second node external to the second node and for use on behalf of the shared cloud storage volume comprises storing the second copy of the authentication credential within a cloud storage service that provides the shared cloud storage volume; and
wherein changing the second copy of the authentication credential associated with the second node comprises changing the second copy of the authentication credential within the cloud storage service.

10. The method of claim 8, wherein storing the second copy of the authentication credential associated with the second node external to the second node and for use on behalf of the shared cloud storage volume comprises storing the second copy of the authentication credential into a storage controller that controls all communications with the shared cloud storage volume; and wherein changing the second copy of the authentication credential associated with the second node comprises changing the second copy of the authentication credential within the storage controller that controls all communications with the shared cloud storage volume.

11. The method of claim 7, wherein changing the information associated with the second node comprises changing the authentication credential associated with the second node to a different authentication credential.

12. The method of claim 7, wherein changing the information associated with the second node comprises invalidating the authentication credential associated with the second node.

13. The method of claim 7, wherein the authentication credential associated with the second node comprises a password of the second node.

14. The method of claim 7, wherein the authentication credential associated with the second node comprises a digital certificate issued to the second node.

15. The method of claim 1, wherein detecting, by the first node, the condition indicating that the second node has possibly failed comprises detecting that the second node has not communicated with the first node within a predetermined time limit.

16. The method of claim 1, further comprising:

in response to detecting, by the second node, that it can no longer access the shared cloud storage volume, re-establishing access to the shared cloud storage volume, by the second node, in coordination with the first node.

17. A system comprising:

a first node and a second node executing on a cloud computing platform;

wherein program code of the first node and the second node, when executed by computing resources of the cloud computing platform including at least one central processing unit, causes the computing resources to:

share at least one cloud storage volume between a first node and a second node executing on a cloud computing platform;

in response to detection, by the first node, of a condition indicating that the second node has possibly failed, change information associated with the second node, through an interface of the cloud computing platform and without communicating with the second node, wherein the information associated with the second node comprises an encryption key associated with the second node that is currently being used to encrypt communications between the second node and the shared cloud storage volume, and wherein the change of the information associated with the second node prevents the second node from subsequently accessing the shared cloud storage volume;

storing, within the second node for use by the second node, a first copy of the encryption key associated with the second node;

storing, external to the second node and for use on behalf of the shared cloud storage volume, a second copy of the encryption key associated with the second node; and wherein changing the information associated with the second node comprises changing the second copy of the encryption key associated with the second node.

18. A computer program product including a non-transitory computer readable medium having instructions stored thereon, wherein the instructions, when executed on processing circuitry, cause the processing circuitry to perform steps including:

sharing at least one cloud storage volume between a first node and a second node executing on a cloud computing platform;

in response to detecting, by the first node, a condition indicating that the second node has possibly failed, changing information associated with the second node, through an interface of the cloud computing platform and without communicating with the second node, wherein the information associated with the second node comprises an encryption key associated with the second node that is currently being used to encrypt communications between the second node and the shared cloud storage volume, and wherein changing the information associated with the second node prevents the second node from subsequently accessing the shared cloud storage volume;

storing, within the second node for use by the second node, a first copy of the encryption key associated with the second node;

storing, external to the second node and for use on behalf of the shared cloud storage volume, a second copy of the encryption key associated with the second node; and wherein changing the information associated with the second node comprises changing the second copy of the encryption key associated with the second node.

\* \* \* \* \*